Patented Oct. 24, 1950

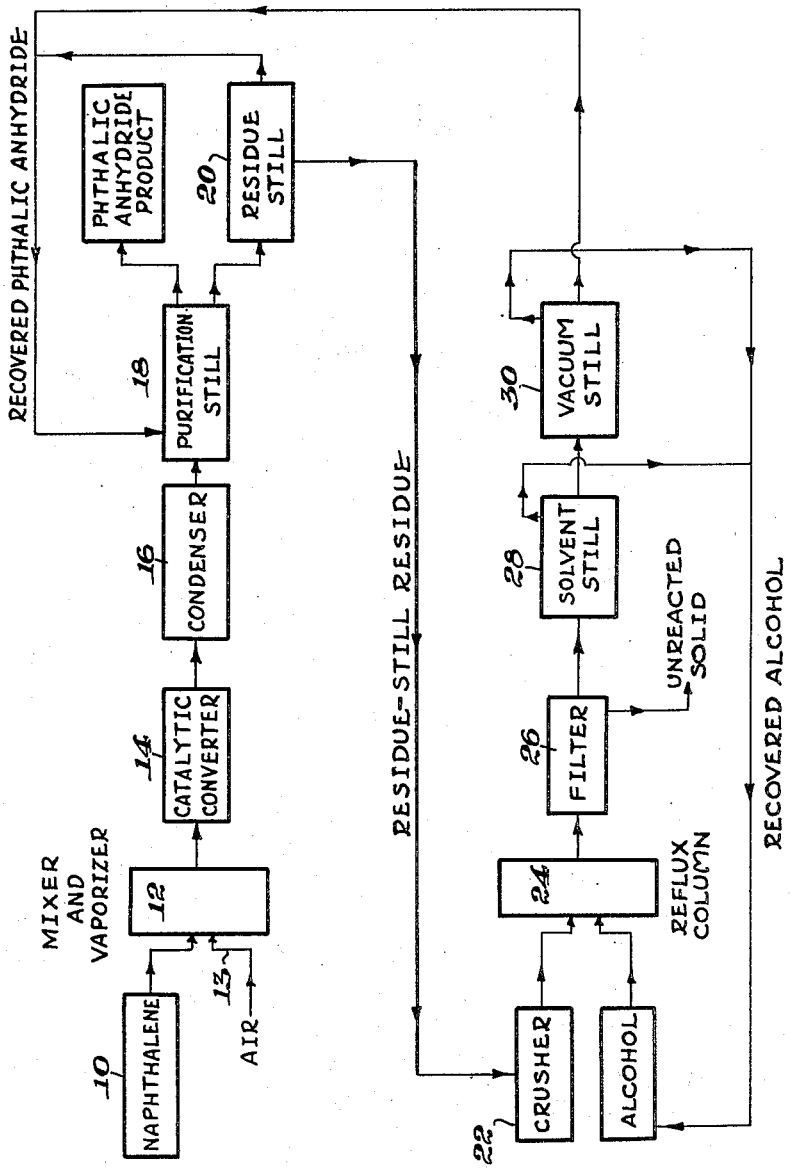

2,526,710

UNITED STATES PATENT OFFICE 2,526,710

RECOVERY OF PHTHALIC ANHYDRIDE FROM STILL RESIDUE

Helen I. Thayer, Pittsburgh, Pa., assignor to Koppers Company, Inc., Pittsburgh, Pa., a corporation of Delaware Application November 12, 1947, Serial No. 785,496

9 Claims. (Cl. 260—342)

1

The present invention relates in general to improvements in a process for the synthesis of phthalic anhydride from naphthalene. The invention has reference in particular to the recovery of phthalic anhydride from still residues produced in the purification by distillation of crude phthalic anyhdride.

Phthalic anhydride is produced in large quantities by the catalytic oxidation of naphthalene. Measured quantities of naphthalene and air are brought into contact with an oxidation catalyst and the naphthalene is thereby oxidized to phthalic anhydride. The produced phthalic anhydride, in vaporous admixture with air, is condensed by various means to produce a crude product. The product is thereafter distilled to obtain pure phthalic anhydride by a series of distillation steps from which is obtained a still residue which contains often as much as 30% phthalic anhydride. It has been found infeasible to remove this remaining portion of phthalic anhydride from the still residue by distillation and consequently its phthalic anhydride content has represented a loss in the overall synthesis. In addition to the mechanical problem of separating the remaining phthalic anhydride from its admixture with decomposition products, and the like, present in the residue, it has been found that phthalic anhydride and naphthoquinone, also present in the still residue, condense in the ratio of one mol of phthalic anhydride for every 3 mols of naphthoquinone to form a complex from which phthalic anhydride cannot be distilled.

The primary object of the present invention is the provision of a method for recovering the phthalic anhydride contained in still residue.

Another object of the present invention is the provision of improvements in the synthesis of phthalic anhydride from naphthalene whereby improved overall yields of phthalic anhydride of marketable purity can be obtained.

The invention has for further objects such other improvements and such other operative advantages or results as may be found to obtain in the processes hereinafter described and claimed.

Briefly stated, the present invention comprehends treating still residues, that are obtained from the final distillation of the product of the catalytic oxidation of naphthalene in preparation of phthalic anhydride, with a saturated monohydroxy alcohol having a molecular weight less than 140 under conditions, particularly the maintenance of low temperatures, that are adapted to produce only a monoester of phthalic anhydride. As the monoester is produced, it is dissolved in an accompanying solvent, for example, an excess of the employed alcohol. An insoluble component of the residue is filtered from the solution of monoester from which the solvent is subsequently distilled, at prescribed temperatures and pressures as hereinafter set forth. The obtained monoester is thermally decomposed by heating it and customarily distilling so-regenerated phthalic anhydride at a reduced pressure. The obtained distillate constitutes a refined phthalic anhydride. The alcohol employed in the process to form the monoester is recovered in substantially unaltered quality and, with make-up for small losses occurring during the treatment, can be returned for recovery of phthalic anhydride from further portions of said still residues.

An important factor of the present invention concerns the special care which must be taken both during the formation (and thermal decomposition) of the monoester substantially to avoid simultaneous formation of the diester phthalate which in the instance of the dimethyl phthalate does not decompose at its boiling temperature. In the case of other diesters, they decompose to form olefins instead of regenerating the employed alcohol and thus do not permit re-use of the alcohol. Therefore, the still residue to be treated is cooled before treatment with the alcohol; solvent alcohol is distilled from the monoester solution at temperatures below about 110° C.; and thermal decomposition of the monoester is performed under a vacuum. In the decomposition the absolute pressure is held to not more than 100 mm., so that the temperature is kept below that temperature at which diesters can form by reaction between regenerated alcohol and monoester which has not yet decomposed. Alcohols having a lower molecular weight than about 140 must be used in order to obtain a proper level of reactivity with the anhydride and permit separation of the alcohol and ester by distillation. The necessity of avoiding formation of diesters by the use of low temperatures makes lower boiling alcohols such as methanol or ethanol preferable in practice of the process. In many instances, especially when solvent alcohol is being distilled from monoester, it had been found that, although the aforesaid maximum temperature limit of 110° C. will prevent substantial diester formation, a preferred maximum temperature limit is 70° C.

In the accompanying drawing which is employed solely for purposes of illustration, the single figure is a diagrammatic outline of an apparatus in which the preferred process of the present invention can be practiced.

Naphthalene is flowed from a storage tank 10 in molten condition and at a measured rate into a vaporizer 12 into which a measured quantity of air is also introduced through line 13. The mixed vapors of air and naphthalene are flowed into a catalytic converter 14 containing a plurality of tubes through which the mixed vapors flow in contact with a granular oxidation catalyst, usually a vanadium oxide. The reaction is strongly exothermic and consequently the catalyst tubes are surrounded by a cooling medium, for example, mercury, which maintains the oxidation at a predetermined temperature, usually about 400° C. The vaporous reaction mixture is flowed to condensing means 16 which can include various condensing means such, for example, as indirect oil contact, water coolers, and large air condensers in which solid phthalic anhydride is recovered.

The produced crude phthalic anhydride is conveyed to distillation means 18 from which substantially pure phthalic anhydride is distilled. Such distillation means usually includes at least two batch stills and an additional still in which residue from the preceding stills is distilled for further quantities of phthalic anhydride. The residue from this secondary still 20 is termed residue-still residue and has a content by weight of about 30% phthalic anhydride.

The residue-still residue is removed from the still 20 and is reduced to small particle size in crusher means 22. The reduction of particle size of the crude phthalic anhydride is an important expedient, and effectively increases the recovery efficiency of the present process. The crushed still residue is thereafter delivered into refluxing means 24 to which is added at least an equal volume and preferably three to four volumes of alcohol. The admixture is heated at the boiling temperature of the alcohol employed, or at about 110° C., whichever is the lower temperature, for several hours. When as much as four volumes of alcohol is employed per volume of residue, substantially complete conversion of the phthalic anhydride content of the residue to the monoalkyl phthalate is obtained in about two hours. When one volume of alcohol is employed per volume of still residue, considerably more time is required to obtain substantially complete recovery, extraction being continued in some instances for twenty-four hours.

The resultant product is cooled and then flowed to filter means 26 wherein alcohol insoluble still residue is separated from alcoholic solution of formed monoalkyl phthalate. The filtrate is flowed from the filter 26 to a still 28 wherein the solvent alcohol is removed by distillation. If a lower alcohol is employed, distillation can be performed under atmospheric pressures, however, vacuum can be employed with profit when necessary to avoid distillation temperatures above a preferred maximum of 70° C. Preferably, distillation should not be continued, when the lower alcohols are employed, to raise the still vapors above a temperature of 70° C. The solid monoester is then transferred to a still 30 and decomposed under a vacuum of between ten to one hundred millimeter Hg absolute pressure, the selected vacuum being determined by that which is necessary to effect decomposition of the monoester at a temperature below about 70° C. Alcohol which is liberated in such thermal decomposition is returned to the treatment of further quantities of still residue. Recovered phthalic anhydride can be further purified by returning it to the phthalic anhydride still 18.

*Example 1*

Still residue, which was formed by a distillation of the residue obtained from a purification still of a phthalic anhydride synthesis, was ground before treatment to pass a No. 40 mesh screen. A 500 gram sample of this residue-still residue was refluxed with 1500 mm. of methanol for 6 hours. The mixture was then cooled to approximately room temperature and was filtered. Thereafter excess methanol was distilled from the formed monoester of which 164.2 grams was obtained. The alcohol soluble product was then thermally decomposed under a vacuum of 14 to 15 mm. Hg absolute pressure and 125.5 grams of product analyzing 96% phthalic anhydride was regenerated. Still residue was similarly treated with methanol for one hour and in another instance for two hours and yields, respectively, of about 40% and 80% of 96% regenerated phthalic anhydride were obtained.

*Example 2*

The isopropyl monoester of phthalic acid was prepared according to the above reaction treatment by reaction between phthalic anhydride and isopropyl alcohol present in the mixture in the ratio of $\frac{5}{10}$ mol phthalic anhydride to 1 mol of isopropyl alcohol. The mixture was refluxed for 2½ hours. Excess isopropyl alcohol was distilled from the filtrate obtained from filtering the reaction mixture and 83.8 grams of alcohol soluble product was recovered. 25 grams of this product was thermally decomposed under a vacuum of 16 mm. Hg absolute pressure and 96% theoretical yield of phthalic anhydride of 96.2% purity was recovered.

*Example 3*

Monocyclohexyl phthalate was prepared using cyclohexanol as the treating alcohol in the manner set forth in Example 2 except that the ratio of reactants here employed was 1 to 1. The reaction mixture was heated for 1 hour and 10 minutes. 56.7% of theoretical yield of the monoester was obtained. 10 grams of the monoester was decomposed under a vacuum of 15 mm. Hg absolute pressure and a 94% yield of phthalic anhydride was recovered.

*Example 4*

A mono-n-octyl phthalate was prepared by similar reaction employing n-octyl alcohol in which equimolar quantities of reactants were present and a 74.9% yield was obtained by heating for two hours within a temperature range of 105 to 115° C. From 10 grams of the ester, 6 grams of phthalic anhydride was regenerated.

*Example 5*

1500 grams of residue-still residue, which had been ground to pass a 40 mesh sieve, was refluxed with 4500 mm. of methanol for a period of 3 hours at approximately 65° C. The mixture was then cooled to 50° C. and filtered at that temperature. The solvent methanol was distilled from the filtrate at atmospheric pressure. 677.9 grams of solid alcohol-soluble product remained in the flask after distillation of the solvent alcohol. The solid product was decomposed by heating and decomposition alcohol was distilled therefrom at atmospheric pressure. 527.3 grams of solid material remained in the flask after decomposition. Phthalic anhydride of approximately 66% purity was obtained by distillation of the aforesaid solid material.

Another sample of still residue constituting also 1500 grams was refluxed in a similar manner with a similar volume of methanol. Alcohol soluble product from the first treatment was decomposed thermally at atmospheric pressure and at temperatures as high as 120° C. Alcohol soluble product obtained from the second treatment was decomposed under a vacuum of 100 mm. Hg absolute pressure and at a maximum temperature of 75° C. Analyses of the products of thermal decomposition clearly demonstrated a marked increase in purity of regenerated phthalic anhydride when carefully maintained lower temperatures under vacuum were employed in the thermal decomposition step. An increase in purity of about 30% was so obtained. The analyses showed that the impurities consisted largely of dimethyl phthalate. As high as 20% of the highest fractions separated during distillation and thermal decomposition of the alcohol-soluble product under atmospheric pressure was found to be dimethyl phthalate.

A study of the quality of both the solvent methanol and the methanol recovered by decomposition of the ester was made in both of the runs of the present example and it was found that the methanol was not materially altered and could be returned without further treatment to the contact of further quantities of still residue.

The invention as hereinbefore set forth is embodied in particular form and manner but may be variously embodied within the scope of the claims hereinafter made.

In the claims the alcohol reactant is referred to as a "saturated monohydroxy alcohol." This term is intended to cover aliphatic or alkyl saturated alcohols and alicyclic saturated alcohols.

I claim:

1. In a process of synthesis of phthalic anhydride from naphthalene by catalytic oxidation in which so-formed phthalic anhydride is purified by distillation, the recovery of phthalic anhydride from residue of such distillation, comprising the steps of: heating the still residue with a saturated monohydroxy alcohol having a molecular weight less than 140 to react such alcohol and phthalic anhydride to form the phthalic acid ester of the alcohol used; separating the said ester from the reaction mixture; decomposing said ester by heating in vacuo at a temperature of less than 110° C. and distilling off alcohol to regenerate phthalic anhydride.

2. A process of recovery of phthalic anhydride from still residue that is produced in distilling the crude phthalic anhydride product of the catalytic oxidation of naphthalene, comprising: heating still residue to a temperature between 25° and 110° C. with an excess of a saturated monohydroxy alcohol, having a molecular weight of less than 140, to react such alcohol and phthalic anhydride contained in the still residue and form the phthalic acid ester of the alcohol used in alcoholic solution; distilling solvent alcohol from the solution at a temperature less than 110° C.; decomposing the said ester in vacuo at a temperature less than 110° C. and thereafter distilling off regenerated phthalic anhydride.

3. The process as claimed in claim 2 in which the alcohol is methanol.

4. The process as claimed in claim 2 in which the alcohol is an alicyclic saturated monohydroxy alcohol.

5. The process as claimed in claim 4 in which the alcohol is cyclohexanol.

6. A process of recovery of phthalic anhydride from still residue that is produced in distilling the crude phthalic anhydride product of the catalytic oxidation of naphthalene, comprising: refluxing particulated still residue with methanol at approximately its boiling temperature for a period of one to six hours to react methanol and phthalic anhydride of the residue and form monomethyl phthalate in solution in excess methanol; filtering unreacted residue from the solution; distilling the solvent methanol from the solution; and decomposing the monomethyl phthalate at a temperature less than 110° C. and in a vacuum of between ten and one hundred millimeters, Hg, absolute pressure to regenerate phthalic anhydride.

7. A process of recovery of phthalic anhydride from still residue that is produced in distilling the crude phthalic anhydride product of the catalytic oxidation of naphthalene, comprising: refluxing particulated still residue with methanol at approximately its boiling temperature for a period of one to six hours to react methanol and phthalic anhydride of the residue and form monomethyl phthalate in solution in excess methanol; filtering unreacted residue from the solution; distilling excess methanol from the solution; decomposing the monomethyl phthalate at a temperature less than 110° C. in a vacuum of between ten and one hundred millimeters, Hg, absolute pressure, to regenerate phthalic anhydride; distilling at the said vacuum the regenerated phthalic anhydride, condensing, and recovering a refined phthalic anhydride; and returning alcoholic distillate to the treatment of further quantities of still residue.

8. In a process of catalytic oxidation of naphthalene to phthalic anhydride, the recovery of phthalic anhydride contained in still residue formed by distillation of phthalic anhydride from crude oxidation product, comprising: treating such still residue with a saturated monohydroxy alcohol having a molecular weight less than 140 to form the phthalic acid ester of the alcohol used; filtering unreacted solid from the refluxed admixture; distilling excess alcohol from the filtrate; decomposing said ester by distillation at a temperature less than 70° C. and at a vacuum of between ten to one hundred millimeters, Hg, absolute pressure; while separating regenerated alcohol therefrom; and recovering regenerated phthalic anhydride by further distillation.

9. In a process of catalytic oxidation of naphthalene to phthalic anhydride, the recovery of phthalic anhydride comprising: distilling phthalic anhydride oxidation product of naphthalene to take phthalic anhydride overhead, heating still residue from the foregoing distillation with a saturated monohydroxy alcohol of molecular weight less than 140, to form the phthalic acid ester of the alcohol used, filtering unreacted solid from the reaction mixture, distilling the obtained filtrate at a temperature less than 110° C. to decompose the said ester, removing the regenerated alcohol by distillation, separating regenerated phthalic anhydride and recycling recovered alcohol to the treatment of further quantities of still residue.

HELEN I. THAYER.

REFERENCES CITED

The following references are of record in the file of this patent:

UNITED STATES PATENTS

| Number | Name | Date |
| --- | --- | --- |
| 2,133,904 | Reichhold et al. | Oct. 18, 1938 |